(12) United States Patent
Dinker et al.

(10) Patent No.: US 7,178,065 B2
(45) Date of Patent: Feb. 13, 2007

(54) SYSTEM AND METHOD FOR MEASURING PERFORMANCE WITH DISTRIBUTED AGENTS

(75) Inventors: Darpan Dinker, San Jose, CA (US); Dhirendra Pandey, Fremont, CA (US); Kannan Bhoopathy, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 600 days.

(21) Appl. No.: 10/405,299

(22) Filed: Apr. 2, 2003

(65) Prior Publication Data

US 2004/0199815 A1    Oct. 7, 2004

(51) Int. Cl.
*G06F 11/00* (2006.01)

(52) U.S. Cl. ........................................................ 714/41
(58) Field of Classification Search .................. 714/41
See application file for complete search history.

(56) References Cited

U.S. PATENT DOCUMENTS

| | | | |
|---|---|---|---|
| 5,454,108 A | | 9/1995 | Devarakonda et al. |
| 5,634,122 A | | 5/1997 | Loucks et al. |
| 5,666,486 A | | 9/1997 | Alfieri et al. |
| 5,684,807 A | | 11/1997 | Bianchini et al. |
| 5,812,780 A | * | 9/1998 | Chen et al. ............... 709/224 |
| 5,852,747 A | | 12/1998 | Bennett et al. |
| 5,913,213 A | | 6/1999 | Wikstrom et al. |
| 5,951,694 A | | 9/1999 | Choquier et al. |
| 6,002,868 A | * | 12/1999 | Jenkins et al. ............... 717/105 |
| 6,006,259 A | | 12/1999 | Adelman et al. |
| 6,032,216 A | | 2/2000 | Schmuck et al. |
| 6,067,559 A | | 5/2000 | Allard et al. |
| 6,097,380 A | | 8/2000 | Crites et al. |
| 6,108,699 A | | 8/2000 | Moiin |
| 6,167,490 A | | 12/2000 | Levy et al. |
| 6,175,931 B1 | | 1/2001 | Hornung |
| 6,192,401 B1 | | 2/2001 | Modiri et al. |
| 6,249,879 B1 | | 6/2001 | Walker et al. |
| 6,324,492 B1 | * | 11/2001 | Rowe .......................... 703/13 |

(Continued)

OTHER PUBLICATIONS

"Concurrency Service Specification," Published Apr. 2000, Object Management Group.

(Continued)

*Primary Examiner*—Scott Baderman
*Assistant Examiner*—Bian Assessor
(74) *Attorney, Agent, or Firm*—Robert C. Kowert; Meyertons, Hood, Kivlin, Kowert & Goetzel, P.C.

(57) ABSTRACT

Various systems and methods for testing one or more servers using a distributed test system may involve a master agent synchronously transitioning multiple test agents through several state changes. In some embodiments, a method may involve configuring multiple test agents to execute a test by initiating a state change to a first state at each of the test agents. Each of the test agents is prepared to execute the test when in the first state. Each of the test agents simulates multiple clients of a server under test when executing the test. In response to each of the test agents confirming the state change to the first state, a state change to a second state may be initiated at each of the plurality of test agents. Each of the test agents executes the test when in the second state.

33 Claims, 5 Drawing Sheets

U.S. PATENT DOCUMENTS

| | | |
|---|---|---|
| 6,330,689 B1 | 12/2001 | Jin et al. |
| 6,477,172 B1 | 11/2002 | Burger et al. |
| 6,480,473 B1 | 11/2002 | Chambers et al. |
| 6,512,740 B1 | 1/2003 | Baniewicz et al. |
| 6,522,995 B1 * | 2/2003 | Conti et al. ............... 702/186 |
| 6,532,494 B1 | 3/2003 | Frank et al. |
| 6,567,808 B1 | 5/2003 | Eschelbeck et al. |
| 6,574,197 B1 | 6/2003 | Kanamaru et al. |
| 6,591,295 B1 | 7/2003 | Diamond et al. |
| 6,718,394 B2 | 4/2004 | Cain et al. |
| 6,748,429 B1 | 6/2004 | Talluri et al. |
| 6,748,554 B2 | 6/2004 | Jin et al. |
| 6,801,937 B1 | 10/2004 | Novaes et al. |
| 6,816,905 B1 | 11/2004 | Sheets et al. |
| 6,820,210 B1 | 11/2004 | Daruwalla et al. |
| 6,847,993 B1 | 1/2005 | Novaes et al. |
| 6,895,401 B2 | 5/2005 | Skinner et al. |
| 6,920,474 B2 | 7/2005 | Walsh et al. |
| 6,928,378 B2 * | 8/2005 | Lebee et al. ............... 702/123 |
| 6,944,788 B2 | 9/2005 | Dinker et al. |
| 6,961,769 B2 * | 11/2005 | Arora et al. ............... 709/224 |
| 2001/0010053 A1 | 7/2001 | Ben-Shacher et al. |
| 2001/0014097 A1 | 8/2001 | Beck et al. |
| 2001/0027453 A1 | 10/2001 | Suto |
| 2001/0040895 A1 | 11/2001 | Templin |
| 2002/0042693 A1 | 4/2002 | Kamp et al. |
| 2002/0062372 A1 | 5/2002 | Hong et al. |
| 2002/0073080 A1 | 6/2002 | Lipkin |
| 2002/0091750 A1 | 7/2002 | Kasaravalli et al. |
| 2002/0143958 A1 | 10/2002 | Montero et al. |
| 2002/0152307 A1 | 10/2002 | Doyle et al. |
| 2003/0110445 A1 | 6/2003 | Khaleque |
| 2003/0131041 A1 | 7/2003 | Dinker et al. |
| 2003/0154202 A1 | 8/2003 | Dinker et al. |
| 2003/0204509 A1 | 10/2003 | Dinker et al. |
| 2003/0204623 A1 | 10/2003 | Cain |
| 2003/0204786 A1 | 10/2003 | Dinker et al. |
| 2004/0044672 A1 | 3/2004 | Spencer |
| 2004/0059805 A1 | 3/2004 | Dinker et al. |
| 2004/0098490 A1 | 5/2004 | Dinker et al. |
| 2004/0103098 A1 | 5/2004 | Mitra |
| 2004/0162885 A1 | 8/2004 | Garg et al. |
| 2004/0199815 A1 | 10/2004 | Dinker et al. |

OTHER PUBLICATIONS

Devarakonda, Murthy et al., "Recovery in the Calypso Filesystem," ACM Transactions on Computer Systems, vol. 14, No. 3, Aug. 1996, pp. 287-310.

* cited by examiner

SYSTEM AND METHOD FOR MEASURING PERFORMANCE WITH DISTRIBUTED AGENTS

BACKGROUND OF THE INVENTION

1. Field of the Invention

The present invention relates to networked computer systems and, in particular, to testing software-based servers.

2. Description of Related Art

Today's networked computing environments include servers that provide various services to clients over a network. Many of these servers handle client requests as transactions. Database and network traffic for such servers are continually increasing. Accordingly, the number, rate, and complexity of the transactions to be handled by servers are also increasing. Furthermore, user expectations regarding reliability and fault-tolerance are also increasing, leading to even more complexity within modern servers.

Given the large volume of transactions expected to be handled by modern servers, testing the ability of a server to handle its expected workload is critical to ensure that the server will operate properly when deployed. Furthermore, testing after deployment may also be necessary to verify that the server continues to function properly over time, after modifications, and/or in light of changing operating circumstances. Testing may also be used to tune the configuration of the hardware and/or software in a system to achieve higher performance. Some tests may also be used in performance benchmarking.

Testing the capabilities of servers that will provide services to a large number of clients is often difficult, especially as the expected workload of such servers continues to increase. One difficulty arises due to the challenges of realistically simulating a large number of users (thousands, millions, or more) that each initiate one or more server transactions in a cost effective way. For example, while a multi-threaded process may be used to simulate multiple clients, it is typically not realistic to test a server with a single process. However, coordination of multiple test processes, which may each be executing multiple iterations of a test, in such way that test results are easily collected is often undesirably difficult. Additionally, it is often desirable to provide scalable testing facilities in order to test a server using differing numbers of clients. Yet another difficulty arises when trying to provide flexible testing capabilities so that the same testing framework may be reused with various different tests and/or different types of applications to be tested. Accordingly, improved testing capabilities are desired.

SUMMARY

Various systems and methods for testing one or more servers using a distributed test system may involve a master agent synchronously transitioning multiple test agents through several state changes. In some embodiments, a method may involve configuring multiple test agents to execute a test by initiating a state change to a first state (e.g., a test initiation state) at each of the test agents. Each of the test agents is prepared to execute the test when in the first state (e.g., each test agent transitions to the first state in response to preparing to execute the test). Each of the test agents simulates multiple clients of a server under test when executing the test. In response to each of the test agents confirming the state change to the first state, a state change to a second state (e.g., a test performance state) may be initiated at each of the plurality of test agents. Each of the test agents executes the test when in the second state.

In one embodiment, such a method may also involve accessing a cluster configuration file to identify each of the plurality of test agents and the master agent. The test agents may confirm each state change by sending a communication to the master agent via a server port identified in the cluster configuration file.

A master agent included in a same cluster as the test agents may initiate the first state change by sending a state change request and configuration information associated with the test to each of the plurality of test agents. The configuration information may include one or more class names, a number of threads, a number of iterations, and a maximum execution time. The master agent may read the configuration information from a configuration file prior to sending the state change request. The master agent may also read the configuration file subsequent to completion of the test. If the configuration file includes other configuration information for another test, the master agent may send the state change request and the other configuration information to the plurality of test agents in order to configure the plurality of test agents to perform the other test. The test agents may be configured to generate load on a different server under test by being configured to execute a different test.

Each test agent may send the master agent test results in response to completing execution of the test. The master agent may store the test results received from each of the plurality of test agents in a location specified in a configuration file. The test results received from each of the plurality of test agents may include a number of iterations of the test executed by each of a plurality of test threads and a total execution time of each of the plurality of test threads. The master agent may aggregate the test results from each of the plurality of test agents. In one embodiment, the master agent may perform statistical analysis on the test results received from each of the plurality of test agents.

Another embodiment of a method may involve: testing a server under test by configuring a plurality of test agents to execute a test and initiating execution of the test at each of the plurality of test agents, where each of the plurality of test agents simulates a plurality of clients of the server under test when executing the test; detecting an error in at least one of the plurality of test agents during testing; and, in response, failing testing prior to each test agent completing execution of the test.

In some embodiments, a computing device may include at least one processor and a memory coupled to the processor. The memory stores program instructions executable by the processor to implement a master agent. The master agent may be configured to test a server under test by distributing test parameters to each of a plurality of test agents and subsequently initiating execution of a test at each of the plurality of test agents, where each of the test agents simulates a plurality of clients of the server under test when executing the test. The master agent may be configured to fail testing (e.g., by transitioning each test agent to an initial state and generating an error indication) in response to detecting an error in one of the plurality of test agents while testing the server under test.

In one embodiment, a system may include a plurality of test agents each configured to simulate a plurality of clients of a server under test during execution of a test and a master agent. The master agent may be configured to initiate a state change to a first state at each of the plurality of test agents. Each of the plurality of test agents is prepared to perform the test when in the first state. In response to each of the plurality of test agents confirming the state change to the first state, the master agent may be configured to initiate a state change to a second state at each of the plurality of test agents. Each of the plurality of test agents is configured to execute the test when in the second state. The test agents may be implemented from a generic test framework that is useable with a variety of different tests. This generic test framework may allow simplified and more flexible programming of the different tests.

According to one embodiment, a computer accessible medium may include program instructions that are executable to: configure a plurality of test agents to execute a test by initiating a state change to a first state at each of the plurality of test agents, where each of the plurality of test agents is prepared to execute a test when in the first state, and where each of the plurality of test agents simulates a plurality of clients of a server under test during execution of the test; and, in response to each of the test agents confirming the state change to the first state, initiate execution of the test at each of the plurality of test agents by initiating a state change to a second state at each of the plurality of test agents, where each of the plurality of test agents executes the test when in the second state.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description are not intended to limit the invention to the particular form disclosed but, on the contrary, the intention is to cover all modifications, equivalents, and alternatives falling within the spirit and scope of the present invention as defined by the appended claims. The headings used are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
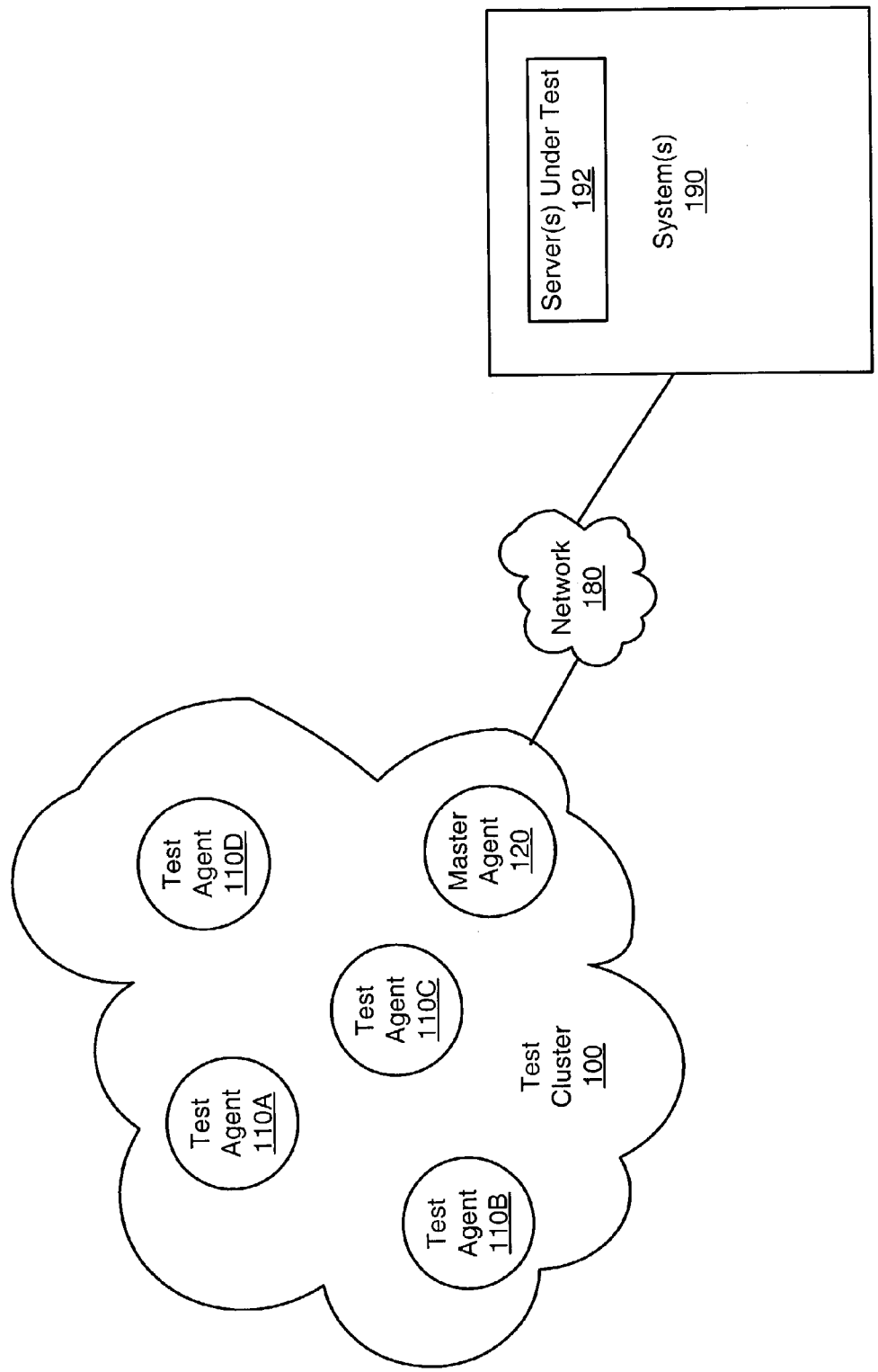
FIG. 1 illustrates a test cluster configured to test one or more servers, according to one embodiment.

FIG. 1 illustrates one embodiment of a test cluster 100 that includes several test agents 110A–110D and a master agent 120. Test cluster 100 is configured to test the performance of one or more servers under test 192 executing on one or more systems 190, which may be coupled to the test cluster by a network 180 such as the Internet. In order to test the performance of the server(s) 192, each test agent 110 simulates several users, or clients, of the server(s) under test 192.

The test agents 110 may each be configured to generate a certain of load on the server(s) under test 192 by simulating a certain number of clients. Each client simulated by a test agent may communicate stimuli to the server(s) under test 192 via the network 180 and receive a response. The test agents may each measure the time between sending stimuli to a server under test 192 and receiving a corresponding response. The cumulative response times for each test agents may indicate how well the server(s) under test 192 perform under the particular amount of load generated by the test agents 110. Note that in some embodiments, each test agent 110 may additionally verify all or some of the responses received from a server under test 192.

The server or servers under test 192 may include one or more of a variety of different types of servers such as web servers, application servers, database servers, intranet servers, and/or multimedia servers. The servers under test 192 may be part of a cluster in some embodiments. For example, the servers under test may include a cluster of web servers that provide clients with access to a retailer's commercial web site. In some situations, different servers under test may have different function (e.g., one web server may respond to client requests for static content, while another responds to client requests for dynamic content). Some servers may provide different levels of quality of service (e.g., depending on whether a client is a subscriber to a premium level of service). Other servers may perform the similar functions in order to provide better service and/or reliability. In other situations, there may only be a single server under test 192.

Test cluster 100 may be configured to perform a variety of different tests. Certain tests may target certain servers within a cluster of servers under test 192. Other tests may target different functionality provided by the same servers under test 192. Still other tests may generate different amounts of load on the same servers under test 192. Note that test cluster 100 may also be configured to perform tests that each target an entirely different group of servers under test 192.

Computing devices on which the test agents 110 and master agent 120 execute may be interconnected by a network of various communication links (e.g., electrical, fiber optic, and/or wireless links). Test cluster 100 may span a large network or combination of networks (e.g., the Internet or a local intranet) in many embodiments. In embodiments where the test cluster 100 is distributed across a network and includes several different test agents 110, the test cluster 100 may more accurately simulate the environment in which the servers under test 192 are designed to operation. Note that other embodiments may include different numbers of test agents than are shown in FIG. 1.

As used herein, an agent 110 and 120 may be a virtual machine, process, or other application. Each agent 110 and 120 may execute on a computing device such as a stand-alone computer or server. Several (or all) agents may execute on a single computing device in some embodiments. In other embodiments, at least some of the agents 110 and 120 may each execute on different computing devices. As used herein, a test cluster includes a master agent and one or more test agents. Such a cluster may support the addition and removal of test agents 110, leading to increased scalability in some embodiments. Additionally, if one test agent 110 fails, another test agent may be added to the test cluster 100 as a replacement.

Figure 2:
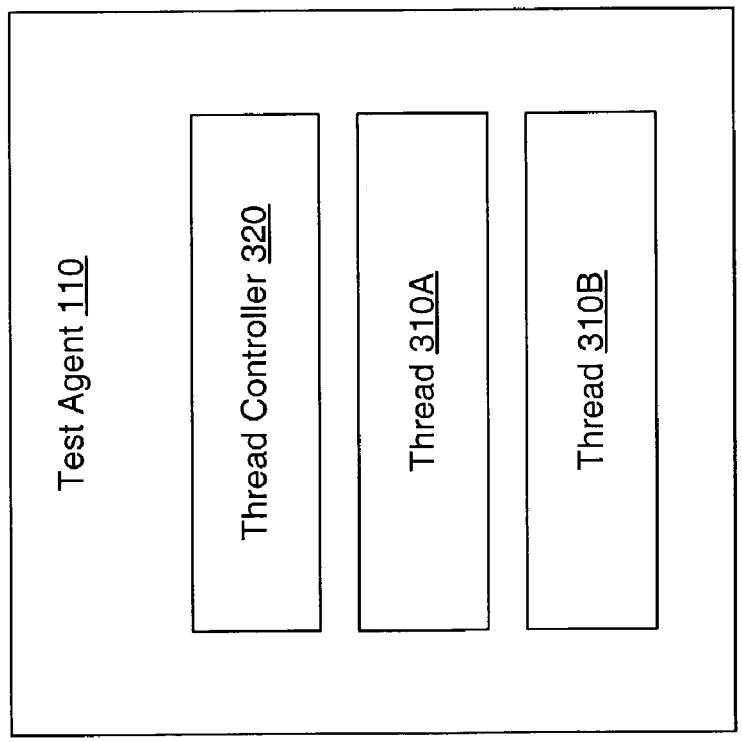
FIG. 2 illustrates a test agent, according to one embodiment.

Each test agent 110 may be implemented as a multi-threaded application, as shown in FIG. 2. Test threads 310 each simulate a client of the servers under test 192. Additionally, each test agent 110 may include another thread 320 that controls that agent's test threads. The thread controller 320 may be configured to initialize one or more test threads 310. The thread controller 320 may configure each thread to perform a particular test (e.g., in response to the master controller 120 communicating the test parameters to the test agent 110). The thread controller 320 may also start and stop execution of each thread 310. The thread controller 320 may be configured to control the number of currently executing threads (e.g., by stopping existing threads and/or by initializing and then executing additional threads). The thread controller 320 may also track the state of each thread.

In some embodiments, each thread 310 may be independently configured to simulate a user having a different environment than a user simulated by another thread. For example, some threads may be configured to have a different "think" time in order to simulate both novice and advanced users of the server under test 192. Similarly, in embodiments where each thread simulates a client who accesses the server under test 192 via a web browser, some threads may be configured to simulate a user having different default browser settings than another other threads. The master agent 120 may communicate test parameters to the test agent 110 that instruct the thread controller 320 to individualize threads (e.g., by specifying a desired set of user characteristics to simulate).

In other embodiments, each thread 310 within the same test agent 110 may be configured to simulate the same user characteristics. However, threads 310 within different test agents 110 may be configured to simulate different user characteristics. The master agent 120 may thus send slightly different test parameters to each test agent 110 in order to differentiate the clients simulated by each test agent.

By implementing test cluster 100 from several multi-threaded test processes (i.e., test agents 110), some embodiments may encounter less thread starvation than if the same number of clients were simulated by a single multi-threaded process. Additionally, each test agent may be executed on a lower performance (and thus lower cost) computing device than would be required to execute such a single multi-threaded process.

Figure 3:
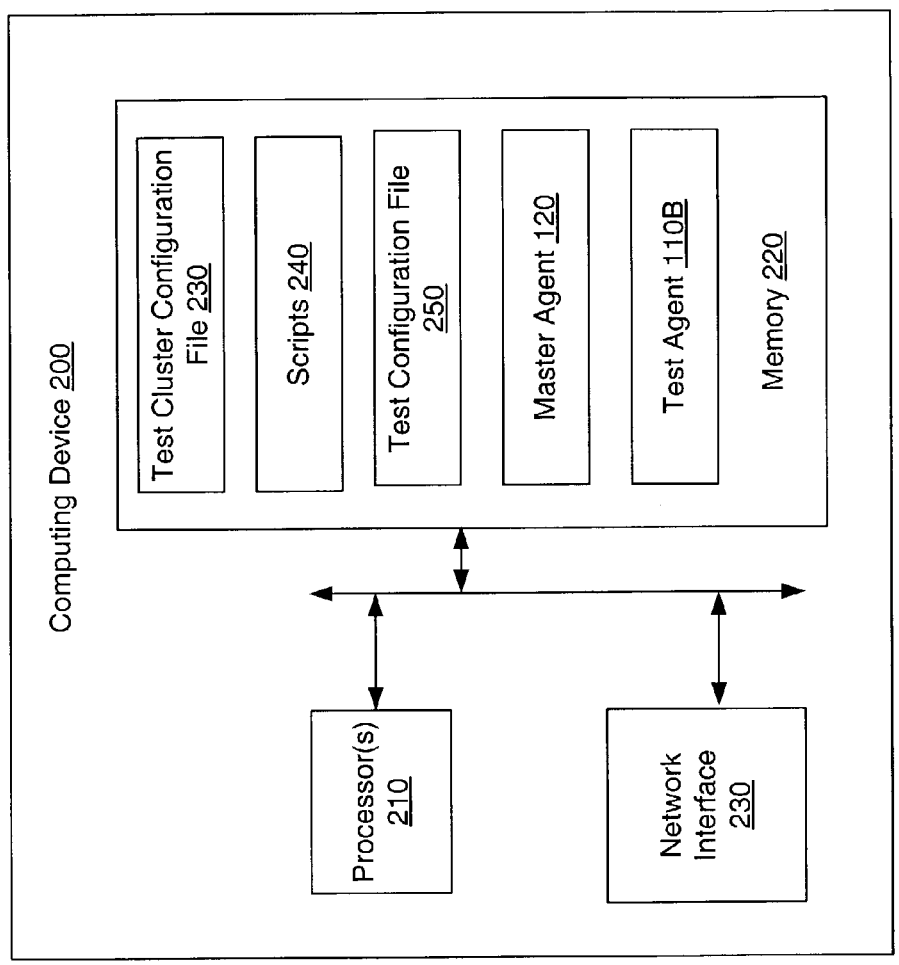
FIG. 3 is a block diagram of a device that may be included in a test cluster, according to one embodiment.

FIG. 3 illustrates one example of a computing device 200 on which one or more test agents 110 and/or master agents 120 may be executing. Note that multiple computing devices 200 may be included in a test cluster 100. A network may couple the computing devices 200 in such embodiments. Additionally, in some embodiments, the computing devices 200 may have various different platforms, operating systems, configurations (e.g., memory size, number and speed of processors), network connections, Internet service providers, etc.

The computing device 200 may include one or more processors 210 configured to execute instructions stored in a memory 220. Memory 220 may be included in a single memory device or distributed throughout computing device 200. The instructions stored in memory 220 may implement one or more test agents 110 (e.g., test agents 110A and 110B as shown) and/or a master agent 120. The computing device 200 may be configured to execute the threads 310 included in each test agent 110 stored in memory 220 at substantially the same time. The computing device 200 may also include a network interface 230 so that the computing device 200 can communicate with the servers under test 192 via a network (e.g., a LAN (Local Area Network), an intranet, the Internet).

The memory 220 in at least one computing device 200 included in test cluster 100 may store information used to implement a test cluster environment for the master agent 120 and test agents 110. This information may include information identifying each test agent 110 and master agent 120 within the test cluster 100, information identifying programs to be executed by each test agent 110, information indicating specific configuration information for each test to be executed by test agents 110, and scripts used to initiate each master agent 120 and test agent 110 within the test cluster 100. For example, in one embodiment, the memory 220 in each computing device 200 included in test cluster 100 may store a test cluster configuration file 230 that lists the number of test agents 110 within the test cluster 100. The cluster configuration file 230 may identify the test cluster 100 with a unique cluster ID. All agents may also be identified in the cluster configuration file 230 with a unique ID. The master agent 120 may additionally be identified within the cluster configuration file 230 with a machine hostname and one or more server ports. Test agents 110 may connect to the master agent 120 over a network via the machine hostname and/or server port identified in the configuration file 230. In one embodiment, a cluster configuration file 230 may also include one or more debug flags, allowing personnel operating the test cluster to view debug messages. An exemplary cluster configuration file 230 used in one embodiment may include information similar to:

DAMP.debug=false
    DAMP.cluster.name=My Cluster Set I
    DAMP.cluster.id=10
    DAMP.cluster.members.total=3
    DAMP.cluster.master.engine.id=200
    DAMP.cluster.members.engine.id.list=200, 100, 300
    DAMP.engine.200.hostname darpan.red.iplanet.com
    DAMP.engine.200.data.port=1800
    DAMP.engine.200.admin.port=1888

Scripts 240 for initiating the agents 110 and 120 within the test cluster 100 may be configured to pass a unique ID (e.g., as specified in the cluster configuration file 230) to each agent when executed. Based on the value of the ID it receives, an agent may identify itself as a test agent 110 or the master agent 120. This identification may in turn allow the agent to select which functions to perform. These scripts may also provide the information identifying programs to be executed by each test agent 110. For example, these scripts 240 may provide the executable paths, Java™ class paths, library paths, scripts, etc. needed for execution of the tests.

The information identifying specific configuration information for each test to be executed may be included in a test configuration file 250. Such a file may identify a sequence of tests to be executed by each test agent. The tests may be identified with a class name, number of threads (per test agent), number of total iterations (per test agent), and/or execution time (e.g., specified in milliseconds). For example, a test configuration file 250 used in one embodiment may contain information about two tests [1] and [2]:

number of total tests
    DAMP.tests.totalNum=2
    DAMP.logging.directory/export/home/damp/tests/results
    DAMP.logging.filename=DAMP_Results.txt
    [1].testClassName=com.iplanet.ias.damp.test.Test_1
    [1].testNumThreads=20
    [1].testDuration_msec=40000
    [1].testMaxIterations=50000
    [2].testClassName=com.iplanet.ias.damp.test.Test_2
    [2].testNumThreads=10
    [2].testDuration_msec=80000

[2].testMaxIterations=25000

Note that the test configuration file 250 may be accessible to the master agent but not to the test agents. The master agent may distribute test parameters included the test configuration file 250 to each test agent (e.g., when requesting a state transition to a begin state, as described below).

In some embodiments, separate test configuration files 250 may be included for each test that may be performed by test cluster 100. In one embodiment, the master agent 120 may access this information and sequentially distribute the test parameters for each test to each test agent 110. Upon completion of one test, the master agent 120 may similarly distribute the test parameters from the next test to the test agents 110. Note that some tests may utilize fewer than all of the test agents 110.

Based on the test parameters received from the master agent 120, each test agent 110 may execute a specified test for a given amount of time or a given number of iterations. If both an amount of time and a number of iterations are specified, a test agent may execute until one of the conditions is met (e.g., the test agent may end testing if the amount of time elapses before the specified number of iterations have been completed or vice versa).

Test agents 110 may each return test results to master agent 120. The test configuration file 250 may also specify one or more directory locations and/or one or more filenames for use by the master agent 120 when storing the results of each test. The individual test agent results may be collected into a test result file similar to:

| Thread# | [100]Itera | [100]Time | [300]Itera | [300]Time |
|---|---|---|---|---|
| Results for TestSuite 1: Test__1 | | | | |
| 0 | 1696849 | 51516 | 365771 | 40844 |
| 1 | 1752577 | 51516 | 333417 | 40812 |
| 2 | 1785171 | 51500 | 343041 | 40812 |
| 3 | 1860422 | 51500 | 344247 | 40828 |
| 4 | 1806593 | 50469 | 368861 | 40828 |
| 5 | 1823064 | 51500 | 344515 | 32375 |
| 6 | 1782586 | 51500 | 341479 | 40828 |
| 7 | 1785297 | 51500 | 348451 | 40828 |
| 8 | 1763917 | 51500 | 375995 | 40828 |
| 9 | 1658229 | 51484 | 346341 | 40812 |
| 10 | 1827117 | 51422 | 339373 | 40812 |
| 11 | 1694477 | 51328 | 405187 | 40812 |
| 12 | 1762181 | 51250 | 379737 | 40797 |
| 13 | 1665782 | 51171 | 377601 | 40781 |
| 14 | 1674801 | 51093 | 378413 | 40766 |
| 15 | 1685889 | 51015 | 378343 | 40750 |
| 16 | 1678504 | 50937 | 404795 | 40734 |
| 17 | 1762017 | 50875 | 367192 | 40719 |
| 18 | 1766179 | 50797 | 410991 | 40703 |
| 19 | 1739123 | 50719 | 379123 | 40687 |
| Results for TestSuite 2: Test__2 | | | | |
| 0 | 4284633 | 83594 | 2598817 | 80016 |
| 1 | 4286647 | 83516 | 2586351 | 80000 |
| 2 | 4348625 | 83438 | 2634763 | 79985 |
| 3 | 4400401 | 83359 | 2539107 | 78657 |
| 4 | 4371005 | 83281 | 2552771 | 79969 |
| 5 | 4427303 | 83203 | 2577021 | 79954 |
| 6 | 4401717 | 83141 | 2613117 | 79938 |
| 7 | 4589529 | 83063 | 2676803 | 79922 |
| 8 | 4393515 | 82985 | 2585715 | 79907 |
| 9 | 4386637 | 82907 | 2635097 | 79891 |

The master agent may collect the individual agents' test results to generate additional result files such as:

Results for TestSuite 1:Test__1
Total iterations=42,303,648 Average time=45,798.703 msec
TPS=923,686.56, TPM=55,421,193.6

Results for TestSuite 2:Test__2
Total iterations=69,889,574 Average time=81,536.3 msec
TPS=857,159.0, TPM=51,429,540.0 where TPS stands for Tests per Second and TPM stands for Tests per Minute.

The master agent 120 within a test cluster 100 may be configured to coordinate the distributed test agents. The master agent 120 may communicate with the distributed test agents in order to synchronously transition the test agents between various operational states. The master agent 120 may synchronously transition the distributed test agents by requesting a state transition from all test agents, confirming the requested state transition from all test agents, and then stepping to the next state if all the test agents have performed the requested state transition. A test agent 110 may either acknowledge or cancel a state transition when the state transition is requested by the master agent. If a test agent 110 cancels a state transition, the master agent 120 may end the test.

Figure 4:
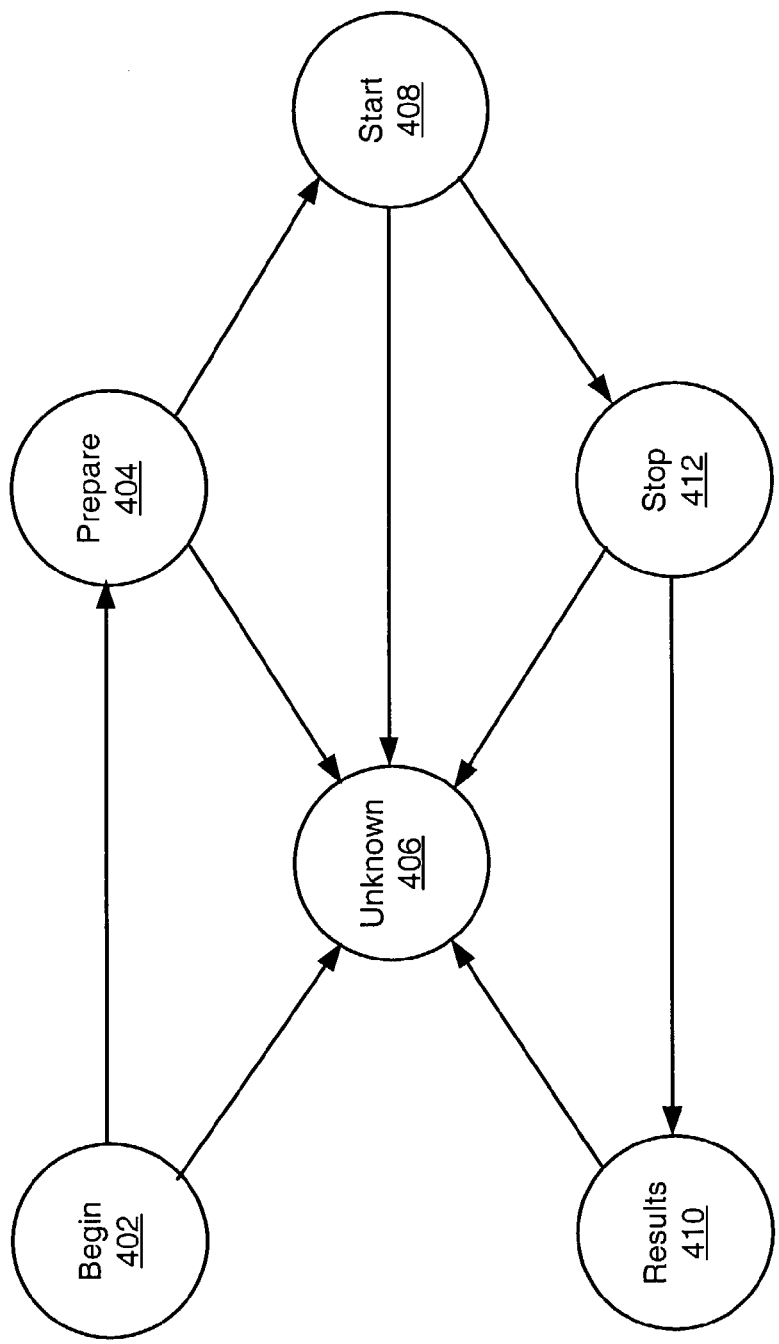
FIG. 4 shows a series of state transitions that may be implemented in a test cluster, in one embodiment.

FIG. 4 is an exemplary state diagram illustrating how the test agents 110 may transition from various states during operation. The master agent 120 may also transition according to the state diagram shown in FIG. 4. The master agent 120 may confirm each state transition with each test agent 110 currently involved in testing. If the state transition is confirmed with all test agents 110, the master agent 120 may transition to the next state. If any test agents 110 fail to acknowledge the state transition (e.g., if one test agents calls an abort or fails to respond within a timeout interval), the master agent 120 may end the test and transition all test agents to the unknown state 406. Additionally, in some embodiments, heartbeat or ping messages may be used to communicate connection status between the master agent 120 and the test agents 110 during a test. If communication of the heartbeat or ping messages is disrupted due to one of the test agents 110 becoming disconnected (e.g., due to failure of that test agent), the master agent 120 may also end the test and transition all test agents 110 to the unknown state.

By ending a test if any test agents 110 abort, timeout, or disconnect during that test, the master agent 120 may avoid running a test unless the results of the test are likely to be satisfactory for testing purposes. For example, a test may be designed to generate a load of 200,000 users on a particular group of servers under test 192. If a test agent 110 that simulates 20 users aborts the test, the test cluster 100 may no longer be able to generate the specified amount of load. Accordingly, rather than spend several minutes or hours executing the test with less than the specified amount of load, the master agent 120 may end the test. This may in turn allow personnel controlling the test cluster 100 to correct the problem and restart the test sooner than they could if they were not alerted to the problem until after unsatisfactory completion of the test.

Each test agent 110 may begin operation in the unknown state 406. The master agent 120 may begin a test by initiating a transition to the begin state 402 within each test agent 110. The master agent may initiate the transition to the begin state 402 by sending a communication requesting the state transition to each test agent 110. The communication may include information allowing each test agent 110 to configure itself for the particular test being performed. For example, the communication may identify a particular test suite, test name, test class, test arguments, and/or other testing information to each test agent 110. The test arguments may include properties such as the number of threads to be implemented in each tests agent 110, the duration of time the test is to be executed, and/or the number of test iterations to perform. In many embodiments, the same test information may be sent to each test agent 110.

In response to receiving communication requesting a transition to the begin state 402, each test agent may transition from the unknown state 406 to the begin state 402 by configuring itself for the test specified in communication and/or verify its ability to perform the test specified in the communication. For example, a test agent 110 may verify whether it has enough threads to run the test by comparing a number of threads available to that test agent to a number of threads specified in the communication. The test agent 110 may also load the tests (e.g., based on the test class name specified in the communication), attach a separate test to each thread, and/or set the properties for each thread. In response to successfully verifying and/or preparing for the test, each test agent 100 may acknowledge the transition to the begin state 402 to the master agent 120.

In response to all test agents 110 acknowledging the transition to the begin state 402, the master agent 120 may transition to the prepare state 404 and initiate a prepare state transition in each test agent 110. The master agent 120 may initiate a prepare state transition by sending another communication to each test agent 110. In response to receiving a communication requesting a prepare state transition, each thread 310 included in each test agent may call a prepare ( ) method on its loaded test class. If the prepare ( ) method is successfully called by each thread 310 in a test agent 110, that test agent 110 may acknowledge the prepare state transition to the master agent 120.

If all test agents 110 acknowledge the prepare state transition, the master agent 120 may transition to the start state 408 and send a communication to each test agent 110 requesting a transition to a start state 408. In response to receiving the communication, each test agent 110 may initiate execution of each thread 310 used for the test and, if successful, return an acknowledgement to the master agent 120. If any test agents 110 call an abort of fail to acknowledge the start state 408 transition within a timeout interval, the master agent 120 may halt the test in the remaining test agents 110 by requesting a transition to the unknown state 406. Thus, the test may be halted before some test agents 110 complete execution in such situations.

Assuming all test agents successfully acknowledge the start state transition, each test agent may execute each of its test threads. Once the thread controller 320 in each test agent 110 reacquires all of its test threads 310, that test agent may transition to the stop state 412. Thus, the transition to the stop state 412 in each test agent 110 may depend on successful execution of the test threads according to the test arguments (e.g., duration, number of iterations, number of threads, etc.). A test agent 110 in the stop state 412 may acknowledge the stop state transition to the master agent 120. In response to all test agents 110 successfully transitioning to the stop state, the master agent 120 may responsively transition to the stop state 412.

After all agents 110 and 120 successfully transition to the stop state 412, the master agent 120 may transition to a results state 410 and initiate a results state transition in each test agent 110. In response to the master agent 120 initiating a results state transition, each test agent 110 may return the results collected during execution of the test to the master agent 120. Test results may include the results of executing each thread (e.g., time for each thread to complete each test iteration, etc.). In embodiments where certain server responses are verified by the test agents, the test results may also indicate whether the verification was successful during the test. The master agent 120 may collect results from each test agent 110, log the detailed results, and/or merge the results so that statistical information about the test may be generated. In response to receiving the test results from each test agent 110, the master agent 120 may request a transition to the unknown state from each test agent, causing each test agent 110 to return to the unknown state 406.

Master agent 120 may store test results in directories and/or files as specified in the test configuration file 250. The master agent 120 may aggregate the test results into combined results from the detailed results provided by each test agent 110. The combined results may indicate the total iterations executed by all test agents 110, the average time duration of test execution, and/or the number of transactions per second and per minute for each test executed by the test cluster 100. A transaction may be the execution of one cycle, or roundtrip communication from the server under test to the test agent, of the test.

Individual test results from each test agent 110 may also be recorded in a test result file by the master agent 120. The individual test results may detail the number of iterations for each of the test agents' threads and the total time duration of test execution per thread for each test agent and each test.

The master agent 120 may also generate heuristic and statistical results for each test. These results may be aggregated from the detailed results provided by each test agent 110. These results may indicate the minimum and maximum response times encountered by a test agent 110 during a test, the average and/or 90% response times encountered by the test agents 110 during the test, and/or the average number of transactions per minute per thread.

Multiple different tests may be specified in the test configuration file 250 described above. In such situations, the master agent 120 may be configured to transition the test agents 110 through the testing cycle of FIG. 4 for each test specified in the test configuration file (e.g., tests may be performed sequentially).

If an error exists within one of the testing programs specified in the test configuration file 250, performance of the test may be unproductive, especially if test performance requires a large amount of computing resources and/or time. In order to increase the amount of testing productivity, the test cluster 100 may be configured to perform "smoke tests" for each test to be performed by that test cluster 100 prior to actually executing each test specified in the test configuration file 250. During a smoke test, the master agent 120 may cause a single test agent 110 to load and execute each test specified in the test configuration file (e.g., by selectively providing test parameters to that test agent that specify a single iteration of each test when requesting a transition to the begin state 402 and then transitioning that test agent through the remaining test states). No test results may stored by the master agent 120 in a result file during smoke testing. Instead, the master agent 120 may output the test results directly to a display (e.g., a monitor coupled to the computing device on which the master agent 120 is executing), allowing personnel controlling the test cluster 100 to immediately detect errors within the test configuration file 250, the testing environment (e.g., whether pathnames are specified correctly), the servers being tested 192, or the tests themselves.

In some embodiments, the master agent 120 may be configured to automatically perform smoke testing prior to performing each test (or prior to performing a group of tests). In other embodiments, the master agent 120 may only perform smoke testing in response to user input and/or specific information in the test configuration file 250 or the cluster configuration file 230 specifically requesting smoke testing (e.g., "smoke testing=true" in configuration file 250).

Various different tests configured to test different types of and/or aspects of a server under test may be developed for performance by a generic test framework implemented by test cluster 100. In order to facilitate efficient test development for use by test cluster 100, a variety of different tests may be created that extend and/or inherit from an abstract test implementation. In one embodiment, the abstract test may include a preparation module for use when each test agent 110 transitions to the prepare state 404. The abstract test may also include various abstract execution modules that may be extended and/or inherited. In other embodiments, stub classes may be used to encapsulate a pre-existing test into a compiled form executable by test cluster 100. These stub classes and/or abstract test classes may form a generic framework useable to implement a variety of different tests.

In one embodiment, tests for use with test cluster 100 may inherit from the following abstract class:

```
public abstract class PerfTest {
    ...
    public abstract void doPrepare ( ) throws Exception;
    public abstract void oneIteration ( ) throws Exception;
    ...
}
```

The abstract method doPrepare ( ) may allow each test agent to transition to the prepare state 404. If the transition is unsuccessful, the method may generate an exception, causing the test agent 110 to abort or not acknowledge the test.

The abstract method oneIteration ( ) may be called for the specified number of iterations (or time duration) during execution.

A specific user test may inherit from the abstract class. An exemplary user test class may be created as follows:

```
public class UserRandomTest extends PerfTest {
    private Random random;
    ...
    /** preparation for the test */
    public void doPrepare ( ) throws Exception {
        RandomHome randHome = ctx.lookup("/env/obj/Random");
        Random = randHome.create (random_seed);
    }
    /**aids in calculating average time taken to get a few random
    values from the server under test */
    public void oneIteration ( ) throws Exception {
        int someInt = random.getNextIntger ( );
        long someLong = random.getNextLong ( );
        double someDouble = random.getNextDouble ( );
    }
    ...
}
```

This user test UserRandomTest extends the doPrepare and oneIteration methods in order to perform a more specific test.

Stub classes may be used to enable tests created using other test frameworks (e.g., JTest from Parasoft Corporation) for execution in test cluster 100. An exemplary stub class may extend a test UserRandomTest2 written using another test framework as follows:

```
/**A user created test stub that inherits from PerfTest */
public class RandomTestStub extends PerfTest {
    private UserRandomTest2 test;
    /** Load the actual test */
    public void doPrepare ( ) throws Exception {
        test = new UserRandomTest2 ( ... );
    }
    /** Call a method (e.g., "execute") on the actual test */
    public void oneIteration ( ) throws Exception {
        test.execute( ... );
    }
}
```

Figure 5:
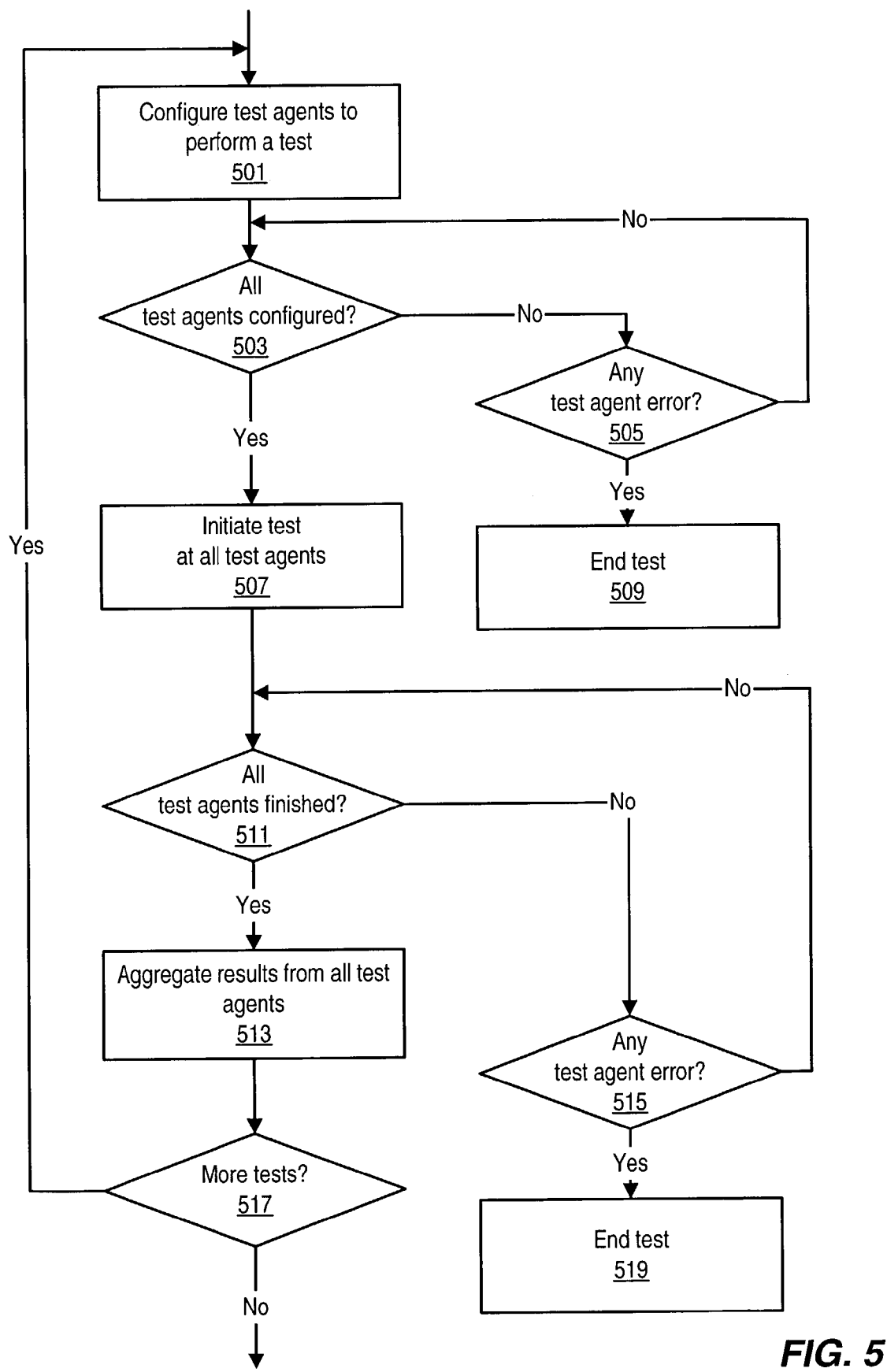
FIG. 5 illustrates a method of operating a test cluster, in one embodiment.

FIG. 5 illustrates one embodiment of a method of testing a server using a test cluster that includes several distributed test agents. At 501, the test agents may be configured to perform a test. The test may be designed to test specific aspects of the server under test. Different tests may be used to test different servers. If an error is detected for any of the test agents (e.g., if a test agent fails to confirm a state transition, becomes disconnected, or explicitly calls for an abort) during configuration, the test may be ended at all of the test agents, as shown at 503–509.

Assuming that configuration of all of the test agents is successful (e.g., as indicated by all of the test agents confirming a state transition), the test may be initiated at all of the test agents, as indicated at 503 and 507. In some embodiments, the test may be synchronously and coherently initiated at each test agent by a master agent included in the test cluster requesting a state transition from the test agents. Each test agent may then perform the test (e.g., by running a number of test threads specified by a master agent according to a test configuration also provided by the master agent). Each test agent may log the results of its performance of the test (e.g., by recording server performance on a per thread basis) while performing the test. Tests may extend an abstract test class designed for use with the test cluster.

When each test agent finishes the test, each test agent may signal its completion of the test (e.g., by confirming a state transition to the next state after a testing state). If all of the test agents successfully complete the test, the individual test results of each test agent may be aggregated into a comprehensive set of test results (e.g., by a master agent), as shown at 511–513.

If an error indicating failure to complete the test is detected for any of the test agents, as determined at 515, the test may be ended at all of the test agents at 519. An error for a test agent may be detected if that test agent fails to confirm a state transition within a timeout period, becomes disconnected from the test cluster, or calls for an abort of the test.

If the test was completed successfully at 511, the test results successfully aggregated from all of the test agents at 513, and more tests remain to be performed, the method shown in FIG. 5 may be repeated for each of the remaining tests, as indicated at 517.

If a test is ended (e.g., at 509 or 519) before successful completion, an error indication may be provided to personnel operating the test cluster (e.g., by a master agent controlling the test cluster). Such an indication may include a visual error icon, message, dialog box, etc. displayed on a monitor, an audio warning (e.g., broadcast from one or more speakers and/or communicated to personnel via phone), an email or page message indicating the error, etc.

Various embodiments may further include receiving, sending or storing instructions and/or data implemented in accordance with the foregoing description upon a computer accessible medium. Generally speaking, a computer accessible medium may include storage media or memory media such as magnetic or optical media, e.g., disk or CD-ROM, volatile or non-volatile media such as RAM (e.g., SDRAM, DDR SDRAM, RDRAM, SRAM, etc.), ROM, etc. as well as transmission media or signals such as electrical, electromagnetic, or digital signals, conveyed via a communication medium such as network and/or a wireless link.

It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:
   prior to configuring a plurality of test agents to execute a test comprising multiple iterations, verifying from a master agent that an execution of an iteration of the test at a particular one of the plurality of test agents does not result in an error;
   configuring the plurality of test agents to execute the test by initiating a state change to a first state at each of the plurality of test agents, wherein each of the test agents is prepared to execute the test when in the first state, and wherein each of the test agents simulates a plurality of clients of a server under test when executing the test; and
   in response to each of the test agents confirming the state change to the first state, initiating a state change to a second state at each of the plurality of test agents, wherein each of the test agents executes the test when in the second state.

2. The method of claim 1, further comprising accessing a cluster configuration file to identify each of the plurality of test agents and the master agent.

3. The method of claim 2, further comprising the plurality of test agents confirming each state change by sending a communication to the master agent via a server port identified in the cluster configuration file.

4. The method of claim 1, wherein said initiating the state change to the first state is performed by the master agent included in a same cluster as the plurality of test agents sending a state change request and configuration information associated with the test to each of the plurality of test agents.

5. The method of claim 4, wherein the configuration information includes one or more class names, a number of threads, a number of iterations, and a maximum execution time, wherein at least one class name of the one or more class names corresponds to a particular class comprising an implementation of an abstract test class defined in a platform-independent programming language, and wherein, to execute the test, a test agent of the plurality of test agents is configured to execute the particular class.

6. The method of claim 4, further comprising the master agent reading the configuration information from a configuration file prior to sending the state change request.

7. The method of claim 6, further comprising the master agent reading the configuration file subsequent to completion of the test; and
   if the configuration file includes other configuration information for an other test, the master agent sending the state change request and the other configuration information to the plurality of test agents in order to configure the plurality of test agents to perform the other test.

8. The method of claim 4, further comprising each of the plurality of test agents confirming the state change to the second state.

9. The method of claim 4, further comprising each of the plurality of test agents sending the master agent test results in response to completing execution of the test.

10. The method of claim 9, further comprising the master agent storing the test results received from each of the plurality of test agents in a location specified in a configuration file.

11. The method of claim 9, wherein the test results received from each of the plurality of test agents include a number of iterations of the test executed by each of a plurality of test threads and a total execution time of each of the plurality of test threads.

12. The method of claim 9, further comprising the master agent aggregating the test results from each of the plurality of test agents.

13. The method of claim 9, further comprising the master agent performing statistical analysis on the test results received from each of the plurality of test agents.

14. The method of claim 1, wherein the plurality of test agents simulates a plurality of clients of a plurality of servers under test when executing the test, wherein the plurality of servers includes a first web server and a second web server, wherein a first subset of the plurality of clients requests only static content from the first web server, and wherein a second subset of the plurality of clients requests only dynamic content from the second web server.

15. The method of claim 1, each of the test agents simulates the plurality of clients of the server under test when executing the test by communicating with the server under test via the Internet.

16. The method of claim 1, further comprising the plurality of test agents simulating a plurality of clients of a different server under test in response to being configured to execute a different test.

17. The method of claim 1, wherein each test agent simulates the plurality of clients by executing a corresponding plurality of test threads.

18. The method of claim 1, further comprising ending execution of the test at each other one of the plurality of test agents in response to one of the plurality of test agents failing to confirm the state change to the second state.

19. A method, comprising:
   receiving a unique identifier at each agent of a plurality of agents in a test environment;
   determining, at each agent of the plurality of agents, whether the agent is a test agent or a master agent using the unique identifier; and
   in response to determining that the agent is the master agent, configuring each of one or more test agents of the plurality of agents to execute a test and initiating execution of the test at each of the one or more test agents, wherein each of the one or more test agents simulates a plurality of clients of a server under test when executing the test; and
   in response to determining that the agent is a test agent, responding to one or more requests from the master agent to execute the test.

20. A computing device, comprising:
at least one processor; and
a memory coupled to the at least one processor, wherein the memory stores program instructions executable by the at least one processor to implement a master agent;
wherein the master agent is configured to:
verify, prior to initiating an execution of a test comprising a plurality of iterations at a plurality of test agents, that an execution of an iteration of the test at a selected test agent of the plurality of test agents does not result in any errors;
initiate a state change to a first state at each of the plurality of test agents in order to configure the plurality of test agents to execute the test, wherein each of the plurality of test agents is prepared to execute the test when in the first state, and wherein at least one of the test agents is implemented on a different computing device;
in response to each of the test agents confirming the state change, initiate a state change to a second state at each of the plurality of test agents, wherein each of the plurality of test agents is configured to simulate a plurality of clients of a server under test by executing the test when in the second state.

21. The computing device of claim 20, wherein the master agent is configured to initiate the state change to the first state at each of the plurality of test agents by sending a state change request and configuration information associated with the test to each of the plurality of test agents.

22. The computing device of claim 21, wherein the configuration information includes one or more class names, a number of threads, a number of iterations, and a maximum execution time.

23. The computing device of claim 21, wherein the master agent is configured to read the configuration information from a configuration file stored in the memory prior to sending the state change request.

24. The computing device of claim 21, wherein the master agent is configured to access the configuration file subsequent to completion of the test and, if the configuration file includes other configuration information for an other test, the master agent is configured to send the state change request and the other configuration information to the plurality of test agents in order to configure the plurality of test agents to perform the other test.

25. The computing device of claim 21, wherein in response to each of the test agents completing execution of the test, the master agent is configured to receive test results from each of the plurality of test agents.

26. The computing device of claim 25, wherein the master agent is configured to store the test results in a location specified in a configuration file stored within the memory.

27. The computing device of claim 25, wherein the test results received from each of the plurality of test agents include a number of iterations of the test executed by each of a plurality of test threads and a total execution time of each of the plurality of test threads.

28. The computing device of claim 25, wherein the master agent is configured to aggregate the test results received from each of the plurality of test agents.

29. The computing device of claim 25, wherein the master agent is configured to perform statistical analysis on the test results received from each of the plurality of test agents.

30. The computing device of claim 20, wherein the master agent is configured to end execution of the test at each other one of the plurality of test agents in response to one of the plurality of test agents failing to confirm the second state change.

31. A computing device, comprising:
at least one processor; and
a memory coupled to the at least one processor, wherein the memory stores program instructions executable by the at least one processor to implement a master agent;
wherein, in response to a detection of a particular setting of a configuration parameter, the master agent is configured to verify, prior to executing a test comprising a plurality of iterations from a plurality of test agents, that a single iteration of the test from a selected one of the test agents does not result in an error;
wherein the master agent is configured to test a server under test by distributing test parameters to each of the plurality of test agents and subsequently initiating execution of the test at each of the plurality of test agents, wherein each of the test agents simulates a plurality of clients of the server under test when executing the test;
wherein the master agent is configured to discontinue the test in response to detecting an error in one of the plurality of test agents while testing the server under test.

32. A computer accessible storage medium comprising program instructions, wherein the program instructions are executable to:
prior to configuring a plurality of test agents to execute a test comprising multiple iterations, verify from a master agent that an execution of an iteration of the test at a particular one of the plurality of test agents does not result in an error;
configure the plurality of test agents to execute the test by initiating a state change to a first state at each of the plurality of test agents, wherein each of the plurality of test agents is prepared to execute a test when in the first state, and wherein each of the plurality of test agents simulates a plurality of clients of a server under test during execution of the test;
in response to each of the test agents confirming the state change to the first state, initiate execution of the test at each of the plurality of test agents by initiating a state change to a second state at each of the plurality of test agents, wherein each of the plurality of test agents executes the test when in the second state.

33. The method as recited in claim 19, wherein said responding to one or more requests from the master agent comprises:
prior to changing state from a first state to a second state in response to a request from the master agent, verifying that at least a number of threads specified in a communication from the master agent are available for execution at the test agent.

* * * * *